(12) United States Patent
Caffarelli

(10) Patent No.: US 7,353,462 B2
(45) Date of Patent: Apr. 1, 2008

(54) GRAPHICAL USER INTERFACE FOR ACCESSING DATA

(75) Inventor: Fabrizio Caffarelli, Milan (IT)

(73) Assignee: TVBLOB S.r.l., Milan (IT)

( * ) Notice: Subject to any disclaimer, the term of this patent is extended or adjusted under 35 U.S.C. 154(b) by 537 days.

(21) Appl. No.: 11/097,070

(22) Filed: Mar. 31, 2005

(65) Prior Publication Data

US 2006/0224987 A1 Oct. 5, 2006

(51) Int. Cl.
*G06F 3/048* (2006.01)
*G06F 15/00* (2006.01)
*G06F 3/14* (2006.01)
*G06F 3/00* (2006.01)

(52) U.S. Cl. .................. 715/825; 715/503; 715/509; 715/767; 715/835; 715/864; 725/40; 725/42; 725/45; 725/52

(58) Field of Classification Search ............... 715/767, 715/825, 835, 864; 725/40, 42, 45, 52
See application file for complete search history.

(56) References Cited

U.S. PATENT DOCUMENTS 5,589,892 A * 12/1996 Knee et al. .................. 725/43
2003/0063129 A1* 4/2003 Smyth et al. ................ 345/810

OTHER PUBLICATIONS

Moxi Menu, 2005, Digeo, Inc., located at http://www.digeo.com/rpdoserv/moxi_menu.jsp.
Moxi Menu Data Sheet, 2005, Digeo, Inc., located at http://www.digeo.com/assets/datasheets/datasheet_moximenu.pdf.
Moxi Viewer's Guide, 2005, Digeo, Inc., located at http://www.digeo.com/assets/manuals/moxi_manual_viewersguide_v3.2.pdf.

* cited by examiner

*Primary Examiner*—Charles D. Garber
*Assistant Examiner*—Aldrin J Piri
(74) *Attorney, Agent, or Firm*—Carr & Ferrell LLP

(57) ABSTRACT

A graphical user interface for accessing data can display hierarchical information in an efficient organized layout that users may easily navigate. In one embodiment, subject headings are contained within cells that form a column. Information related to the subject headings is contained within cells which are formed in rows that are adjacent and orthogonal to the column. The information contained within the rows of cells is related to the closest subject heading in the column.

One of the cells contained within the rows is a focus cell. The user may activate the focus cell to access a lower level within the hierarchy of information where the contents of the focus cell become a subject heading in the cell within the column. The user may browse the data by selecting a non-focus cell causing the contents within the rows of cells to appear to move from cell to cell.

31 Claims, 10 Drawing Sheets

FIG. 1

| Classifieds | | | |
|---|---|---|---|
| baby stuff 110a | beds 130a | clothing 130b | high chairs 130c |
| cars 110b | by location 135a | by make 135b | by price 135c |
| computers 110c | by mfr. 140a | by price 140b | by type 140c |

FIG. 2

| Classifieds | | | |
|---|---|---|---|
| baby stuff 110a | appliances 130a | beds 130b | clothing 130c |
| cars 110b | by year 135a | by location 135b | by make 135c |
| computers 110c | by type 140a | by mfr. 140b | by price 140c |

FIG. 3

| Classifieds - Cars | | | |
|---|---|---|---|
| by year 110a | 2005 130a | 2004 130b | 2003 130c |
| by location 110b | within 5 mi. 135a | in my city 135b | other location 135c |
| by make 110c | Acura 140a | Alfa Romeo 140b | Audi 140c |

| 100 | Classifieds – Cars – in my city | | | 150 |
|---|---|---|---|---|
| within 5 mi.<br>110a | Acura<br>130a | Alfa Romeo<br>130b | Audi<br>130c | 115 |
| in my city<br>110b | Acura<br>135a | Alfa Romeo<br>135b | Audi<br>135c | 120 |
| other location<br>110c | Acura<br>140a | Alfa Romeo<br>140b | Audi<br>140c | 125 |

105     FIG. 4a     145

| 100 | Classifieds – Cars – in my city, Alfa Romeo | | | 150 |
|---|---|---|---|---|
| Acura<br>110a | by model<br>130a | by price<br>130b | by mileage<br>130c | 115 |
| Alfa Romeo<br>110b | by model<br>135a | by price<br>135b | by mileage<br>135c | 120 |
| Audi<br>110c | by model<br>140a | by price<br>140b | by mileage<br>140c | 125 |

105     FIG. 5a     145

| 100 | Classifieds – Cars – in my city, Alfa Romeo, by price | | | 150 |
|---|---|---|---|---|
| by model<br>110a | 147<br>130a | 156<br>130b | Sportwagon<br>130c | 115 |
| by price<br>110b | <$5,000<br>135a | $5-10,000<br>135b | $10-15,000<br>135c | 120 |
| by mileage<br>110c | <50,000 mi<br>140a | 50-100,000 mi<br>140b | >100,000 mi<br>140c | 125 |

| | | | | |
|---|---|---|---|---|
| | Classifieds – Cars | | | 150 |
| by year 110a | 2004 130a | 2003 130b | 2002 130c | } 115 |
| by location 110b | in my city 135a | other location 135b | ... 135c | } 120 |
| by make 110c | Alfa Romeo 140a | Audi 140b | BMW 140c | } 125 |

| | | | | |
|---|---|---|---|---|
| | Classifieds – Cars – other location | | | 150 |
| entire state 110a | Colorado 130a | Connecticut 130b | Delaware 130c | } 115 |
| city 110b | in Colorado 135a | in Connecticut 135b | in Delaware 135c | } 120 |
| [in Italy] provincia 110c | Abruzzi 140a | Valle d'Aosta 140b | Basilicata 140c | } 125 |

| | | | | |
|---|---|---|---|---|
| | Classifieds – Cars – other location, in Connecticut | | | 150 |
| Massachusetts 110a | Boston 130a | Roxbury 130b | Salem 130c | } 115 |
| Connecticut 110b | Bridgeport 135a | New Haven 135b | New London 135c | } 120 |
| New York 110c | Albany 140a | New York 140b | Schenectady 140c | } 125 |

100, 105, 145

| Classifieds – Cars – in my city, Alfa Romeo, by price, $5-10,000 | | | | |
|---|---|---|---|---|
| <$5,000 110a | '71 Spider $4950 130a | '77 Spider $4000 130b | 130c | |
| $5-10,000 110b | '95 164 $9,650 135a | '87 Spider $9,000 135b | '88 Spider $7,900 135c | |
| $10-15,000 110c | '91 Spider $11,995 140a | 140b | 140c | |

FIG. 7a

GRAPHICAL USER INTERFACE FOR ACCESSING DATA

BACKGROUND

1. Field of the Invention

The present invention relates generally to graphical user interfaces and methods. More particularly, the present invention relates to systems and methods of a graphical user interface for accessing data.

2. Background Art

As electronic features increase and the availability of information becomes more prevalent, consumers are finding interactive guides necessary to navigate data. For example, consumers may use an electronic program guide to find their favorite television show, use a cell phone interactive guide to program their favorite ringtones, or engage a search engine to search websites on the Internet.

Available graphical user interfaces that act as interactive guides, however, may display information inefficiently. Existing solutions, such as electronic program guides and Internet directories, are two dimensional. As soon as the consumer drills down or across a set of information, the view of the information categories may be lost. Further, the amount of data displayed to the user may be too narrow. As a result, the user may miss relevant data.

Moreover, some existing solutions may block a large portion of the visible area on the screen of an electronics device, thereby eliminating useful screen space. For example, when searching Google, a consumer may be inundated with pages full of unrelated search results that fill the browser window. In another example, the electronic program guide may block a television screen with multiple windows of programs and programming times.

Cell phones, personal digital assistants, and digital devices with relatively little display area are constrained by limited interactive guides that attempt to manipulate large, complex sets of data with limited user inputs. The results have been inefficient, complex, and difficult for the consumer to use.

SUMMARY OF THE INVENTION

A method comprising a graphical user interface comprising a column of cells comprising a first cell containing a first subject heading and a second cell containing a second subject heading, a first row of cells adjacent to the first cell, the first row of cells comprising a third cell containing a first content related to the first subject heading and a fourth cell containing a second content related to the first subject heading, and a second row of cells adjacent to the second cell and the first row of cells, the second row of cells comprising a fifth cell containing a third content related to the second subject heading, and a focus cell containing a fourth content related to the second subject heading; receiving a first focus cell activation from a user; redisplaying the graphical user interface comprising the column of cells comprising the first cell containing a third subject heading comprising the third content and the second cell containing a fourth subject heading comprising the fourth content, the first row of cells comprising the third cell containing a fifth content related to the third subject heading and the fourth cell containing a sixth content related to the third subject heading, and the second row of cells comprising the fifth cell containing a seventh content related to the fourth subject heading, and the focus cell containing an eighth content related to the fourth subject heading.

The method may further comprise receiving a cell selection from the user; and redisplaying the third cell containing the sixth content related to the third subject heading, the fourth cell containing a ninth content related to the third subject heading, the fifth cell containing the eight content related to the fourth subject heading, and the focus cell containing a tenth content related to the fourth subject heading. Moreover, the method may further comprise receiving a cell selection from the user; and redisplaying the third cell containing a ninth content related to the third subject heading, the fourth cell containing the fifth content related to the third subject heading, the fifth cell containing a tenth content related to the fourth subject heading, and the focus cell containing the seventh content related to the fourth subject heading.

The method may also further comprise receiving a cell selection from the user; and redisplaying the first cell containing the fourth subject heading, the second cell containing a fifth subject heading, the third cell containing the seventh content related to the fourth subject heading, the fourth cell containing the eighth content related to the fourth subject heading, the fifth cell containing a ninth content related to the fifth subject heading, and the focus cell containing a tenth content related to the fifth subject heading. Moreover, the method may also further comprise receiving a cell selection from the user; and redisplaying the first cell containing a fifth subject heading, the second cell containing the third subject heading, the third cell containing a ninth content related to the fifth subject heading, the fourth cell containing a tenth content related to the fifth subject heading, the fifth cell containing the fifth content related to the third subject heading, and the focus cell containing the sixth content related to the third subject heading.

The method may also further comprise receiving a second cell activation from the user; and redisplaying the first cell containing a fifth subject heading, the second cell containing a sixth subject heading, the third cell containing a ninth content related to the fifth subject heading, the fourth cell containing a tenth content related to the fifth subject heading, the fifth cell containing an eleventh content related to the sixth subject heading, and the focus cell containing a twelfth content related to the sixth subject heading.

The method wherein the graphical user interface may further comprise a focus frame surrounding the focus cell. Moreover, a history bar indicating a position within a data structure may be displayed. Further, advertisements, and a media window may be displayed.

A system comprising a means to display a graphical user interface comprising a column of cells comprising a first cell containing a first subject heading and a second cell containing a second subject heading, a first row of cells adjacent to the first cell, the first row of cells comprising a third cell containing a first content related to the first subject heading and a fourth cell containing a second content related to the first subject heading, and a second row of cells adjacent to the second cell and the first row of cells, the second row of cells comprising a fifth cell containing a third content related to the second subject heading, and a focus cell containing a fourth content related to the second subject heading; a means to receive a first focus cell activation from a user; and a means to redisplay the graphical user interface comprising the first cell containing a third subject heading comprising the third content and the second cell containing a fourth subject heading comprising the fourth content, the first row of cells comprising the third cell containing a fifth content related to the third subject heading and the fourth cell containing a sixth content related to the third subject heading, and the second row of cells comprising the fifth cell containing a seventh content related to the fourth subject heading, and the focus cell containing an eighth content related to the fourth subject heading.

An interactive guide system comprising a display device configured to initially display a graphical user interface comprising a column of cells comprising a first cell containing a first subject heading and a second cell containing a second subject heading, a first row of cells adjacent to the first cell, the first row of cells comprising a third cell containing a first content related to the first subject heading and a fourth cell containing a second content related to the first subject heading, and a second row of cells adjacent to the second cell and the first row of cells, the second row of cells comprising a fifth cell containing a third content related to the second subject heading, and a focus cell containing a fourth content related to the second subject heading; an input/output interface configured to receive a first focus cell activation from a user; and a processor configured to command the display device to redisplay the graphical user interface comprising the first cell containing a third subject heading comprising the third content and the second cell containing a fourth subject heading comprising the fourth content, the first row of cells comprising the third cell containing a fifth content related to the third subject heading and the fourth cell containing a sixth content related to the third subject heading, and the second row of cells comprising the fifth cell containing a seventh content related to the fourth subject heading, and the focus cell containing an eighth content related to the fourth subject heading

BRIEF DESCRIPTION OF THE DRAWINGS

FIG. 1 illustrates a graphical user interface for accessing classified advertisements, in accordance with one embodiment;

FIG. 2 illustrates the graphical user interface for accessing classified advertisements after the user selected an adjacent cell to the focus cell of FIG. 1, in accordance with one embodiment;

FIG. 3 illustrates the graphical user interface for accessing classified advertisements after the user activated the focus cell of FIG. 2, in accordance with one embodiment;

FIG. 4a illustrates the graphical user interface for accessing classified advertisements after the user activated the focus cell in FIG. 3, in accordance with one embodiment;

FIG. 5a illustrates the graphical user interface for accessing classified advertisements after the user activated the focus cell in FIG. 4, in accordance with one embodiment;

FIG. 6a illustrates the graphical user interface for accessing classified advertisements after the user activated the focus cell in FIG. 5, in accordance with one embodiment;

FIG. 7a illustrates the graphical user interface for accessing classified advertisements after the user activated the focus cell in FIG. 6, in accordance with one embodiment;

FIG. 4b illustrates an alternate depiction of the graphical user interface for accessing classified advertisements after the user selected the adjacent cell to the focus cell in FIG. 3, in accordance with one embodiment;

FIG. 5b illustrates an alternate depiction of the graphical user interface for accessing classified advertisements after the user activated the focus cell in FIG. 4b, in accordance with one embodiment;

FIG. 6b illustrates an alternate depiction of the graphical user interface for accessing classified advertisements after the user activated the focus cell in FIG. 5b, in accordance with one embodiment;

DETAILED DESCRIPTION OF THE EMBODIMENTS

Figure 8:
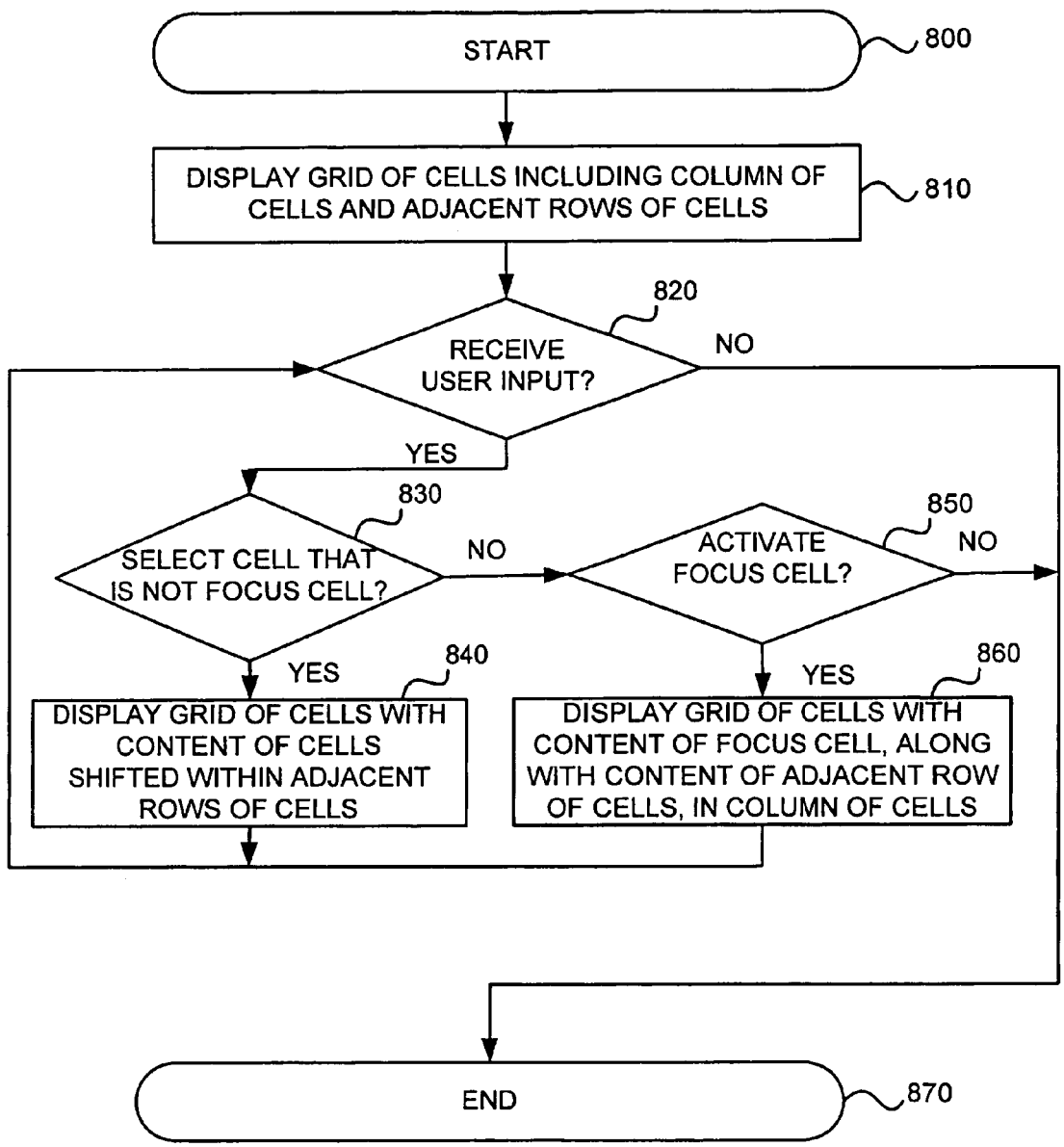
FIG. 8 is a flowchart depicting a method for the graphical user interface as may be used for accessing classified advertisements depicted in FIGS. 1-7, in accordance with one embodiment.

A graphical user interface for accessing data can display hierarchical information in an efficient organized layout that users may easily navigate. In one embodiment, subject headings are contained within cells that form a column. Information related to the subject headings is contained within cells which are formed in rows that are adjacent and orthogonal to the column. In this embodiment, the information contained within the rows of cells is related to the closest subject heading in the column.

One of the cells contained within the rows is a focus cell. In one embodiment, the focus cell does not move. The user may cause the content within the rows of cells to appear to move from cell to cell, thereby allowing the user to browse through the data, by selecting one of the cells contained within the rows which is not the focus cell. The user may also activate the focus cell which allows the user to access additional information.

The effect of activating the focus cell may differ depending on the position within the hierarchical information displayed by the graphical user interface. For example, activating the focus cell may cause the graphical user interface to display data at a lower level within the hierarchical information. If the graphical user interface is already displaying the lowest level of the hierarchical information, then activating the focus cell may cause either details about the information within the focus cell to be displayed or additional functions to become available.

In an embodiment, the graphical user interface allows the user to perform complex searches using simple input devices. In an example, the user need only the capability to move up, down, left, and right (e.g. with arrow keys), to make a cell selection or to activate the focus cell. In this example, complex searches may be accomplished where both screen size and input/output interface are limited (e.g. a cell phone or personal digital assistant).

FIGS. 1-3, 4a-7a, and 4b-6b illustrate possible examples of the graphical user interface after the displays depicted in FIGS. 1-3 in accordance with a particular configuration of the graphical user interface. Although FIGS. 1-3, 4a-7a, and 4b-6b depict the graphical user interface as a tabular grid of cells, the graphical user interface may also be depicted in a more fanciful manner. In some embodiments, the graphical user interface may comprise the grid of cells, advertisements and a media window. In another embodiment, the graphical user interface may be depicted as a horizontal virtual cylinder. The cylinder could be drawn so as to look three-dimensional, with shape, shading, and distortion of text within the cells to create an illusion of depth, so that the central row appears closest to the viewer. Moreover, the columns of the virtual cylinder may be depicted as rotating to display new information. Similarly, the graphical user interface may depict cell content moving from cell to cell within the adjacent row of cells along the length of the virtual cylinder in a direction orthogonal to the virtual cylinder rotation. The graphical user interface may be implemented on many digital devices, including a computer, television, cell phone, personal digital assistant, or any other digital device with a display.

FIG. 1 illustrates a graphical user interface 100 for accessing classified advertisements, in accordance with one embodiment. In this example, the graphical user interface 100 comprises a grid of cells. Within the grid, a column of cells 105 contains cells 110a, 110b, and 110c. Subject headings are contained within the cells 110a, 110b, and 110c. In this example, cell 110a contains the subject heading "baby stuff", cell 110b contains the subject heading "cars", and cell 110c contains the subject heading "computers". In other embodiments, there may be any number of cells containing subject headings within the column of cells 105.

Also within the grid, adjacent rows of cells 115, 120, and 125 extend orthogonally from the column of cells 105. The content within each cell 130a, 130b, 130c, 135a, 135b, 135c, 140a, 140b, and 140c is associated with its closest subject heading within the column of cells 105. In this example, the adjacent row of cells 115 contains cells 130a, 130b, and 130c. Cells 130a, 130b, and 130c contain information related to the subject heading within the closest cell 110a in the column of cells 105. In this example, the content of cells 130a ("beds"), 130b ("clothing"), and 130c ("high chairs") contain information that is associated with the subject heading "baby stuff" contained within the cell 110a. Similarly, the content of cells 135a ("by location"), 135b ("by make"), and 135c ("by price") within the row of cells 120 contain information that is associated with the subject heading "cars" contained within the cell 110b. Moreover, the content of cells 140a ("by mfr."), 140b ("by price"), and 140c ("by type") within the row of cells 125 contain information that is associated with the subject heading "computers" contained within the cell 110c. In other embodiments, there may be any number of rows of cells 115, 120, and 125, with any number of cells 130a, 130b, 130c, 135a, 135b, 135c, 140a, 140b, and 140c, which may contain information.

In one embodiment, a history bar 150 is displayed above the grid of cells. The history bar 150 depicts the general name or topic of the hierarchical information being viewed as well as a current position within the hierarchical information depicted by the graphical user interface 100. In this example, the history bar 150 only displays "Classifieds" since the user is viewing the most general information available.

In this embodiment, cell 135b is a focus cell. The focus cell 135b is identified by a black focus frame 145. In other embodiments, the focus cell 135b may be identified by a focus frame 145 that is of a different color. In still other embodiments, the focus cell 135b may use any of a variety of known display techniques to indicate that it is a different color or otherwise distinct from the other cells within the graphical user interface.

The user may choose to select one of the cells 130a, 130b, 130c, 135a, 135c, 140a, 140b, or 140c, from the rows of cells 115, 120, or 125. By selecting one of the cells 130a, 130b, 130c, 135a, 135c, 140a, 140b, or 140c, information within the cells 130a, 130b, 130c, 135a, 135b, 135c, 140a, 140b, or 140c may appear to shift. The contents of the selected cell may now be displayed within the new focus cell 135b. This process is further described herein.

There may be many ways the user may select the cell 130a, 130b, 130c, 135a, 135c, 140a, 140b, or 140c. The user may position a cursor over the cell 130a, 130b, 130c, 135a, 135c, 140a, 140b, or 140c, and then press an "enter" or a selection key on an input/output device, such as a mouse, keyboard, touch-screen, or remote control. Alternately, the user may select the cell 130a, 130b, 130c, 135a, 135c, 140a, 140b, or 140c by pressing arrow keys on an input/output device.

Similarly, a "text input" function may be included to assist the user to select the cell 130a, 130b, 130c, 135a, 135c, 140a, 140b, or 140c. In an example, the user may type the contents of cell 130b in order to select the cell 130b. In this example, the user may type a few or all of the letters or numbers contained within the cell 130b in order to select the cell 130b. The user may type characters or numbers with a keyboard, touch-screen, or cellphone.

Those skilled in the art will appreciate that there may be many ways to select the cell 130a, 130b, 130c, 135a, 135c, 140a, 140b, or 140c.

In the example depicted, the user selects cell 135a which contains "by location". An example of the resulting graphical user interface 100 may appear as FIG. 2.

FIG. 2 illustrates the graphical user interface 100 for accessing classified advertisements after the user selected an adjacent cell 135a to the focus cell 135b in FIG. 1, in accordance with one embodiment. The focus cell 135b now contains "by location". The content within the other cells 130a, 130b, 130c, 135a, 135c, 140a, 140b, and 140 has shifted within the rows of cells 115, 120, and 125. As a result, new information is now displayed within the cells 130a ("appliances"), 135a ("by year"), and 140a ("by type") while information formerly contained in the cells 130c, 135c, and 140c visible in FIG. 1 is no longer visible in FIG. 2.

In another example, if the user had selected cell 135c which contained "by price" in FIG. 1, the focus cell 135b would then contain "by price" and the contents within the other cells 130a, 130b, 130c, 135a, 135c, 140a, 140b, or 140 would have shifted in the opposite direction.

In the example depicted, the user activates the focus cell 135b which contains "by location". An example of the resulting graphical user interface 100 may appear as shown in FIG. 3.

FIG. 3 illustrates the graphical user interface 100 for accessing classified advertisements after the user activated the focus cell 135b of FIG. 2, in accordance with one embodiment. By activating the focus cell 135b, the information formerly contained within the cells 135a ("by year"), 135b ("by location"), and 135c ("by make") in FIG. 2 is displayed as subject headings within cells 110a, 110b, and 110c, respectively, within the column of cells 105 as shown in FIG. 3. New information is now contained within the cells 130a ("2005"), 130b ("2004"), 130c ("2003"), 135a ("within 5 mi."), 135b ("in my city"), 135c ("other location"), 140a ("Acura"), 140b ("Alfa Romeo"), and 140c ("Audi"). The history bar 150 displays the name of the hierarchical information as "Classifieds" and further displays the position within the hierarchical information depicted by the graphical user interface 100 as the "Cars" subject heading.

In the example depicted, the user activates the focus cell 135b which contains "in my city". Depending on the configuration of the graphical user interface 100, an example of the resulting graphical user interface 100 may appear as shown in FIG. 4a, or, alternately, the resulting graphical user interface 100 may appear as shown in FIG. 4b. The configuration of the graphical user interface 100 may be dictated by the programming or the structure of the hierarchical information itself.

FIG. 4a illustrates the graphical user interface 100 for accessing classified advertisements after the user activated the focus cell 135b in FIG. 3, in accordance with one embodiment. Similar to the graphical user interface 100 depicted in FIG. 3, the information formerly contained within the cells 135a ("within 5 ml."), 135b ("in my city"), and 135c ("other location") in FIG. 3 is displayed as subject headings within the cells 110a, 110b, and 110c, respectively, within the column of cells 105 as shown in FIG. 4a. New information is now contained within the cells 130a ("Acura"), 130b ("Alfa Romeo"), 130c ("Audi"), 135a ("Acura"), 135b ("Alfa Romeo"), and 135c ("Audi"). The history bar 150 displays the name of the hierarchical information as "Classifieds" and the position within the hierarchical information depicted by the graphical user interface 100 as "Cars—in my city".

In the example depicted, the user activates the focus cell 135b which contains "Alfa Romeo". An example of the resulting graphical user interface 100 may appear as shown in FIG. 5a.

FIG. 5a illustrates the graphical user interface 100 for accessing classified advertisements after the user activated the focus cell 135b in FIG. 4a, in accordance with one embodiment. Similar to the graphical user interface 100 depicted in FIG. 4a, the information formerly contained within the cells 135a ("Acura"), 135b ("Alfa Romeo"), and 135c ("Audi") in FIG. 4a is displayed as subject headings within the cells 110a, 110b, and 110c, respectively, within the column of cells 105 as shown in FIG. 5a. New information is now contained within the cells 130a ("by model"), 130b ("by price"), 130c ("by mileage"), 135a ("by model"), 135b ("by price"), 135c ("by mileage"), 140a ("by model"), 140b ("by price"), and 140c ("by mileage"). The history bar 150 displays the name of the hierarchical information as "Classifieds" and the position within the hierarchical information depicted by the graphical user interface 100 as "Cars—in my city, Alfa Romeo".

In the example depicted, the user activates the focus cell 135b which contains "by price". An example of the resulting graphical user interface 100 may appear as shown in FIG. 6a.

FIG. 6a illustrates the graphical user interface 100 for accessing classified advertisements after the user activated the focus cell 135b in FIG. 5a, in accordance with one embodiment. Similar to the graphical user interface 100 depicted in FIG. 5a, the information formerly contained within the cells 135a ("by model"), 135b ("by price"), and 135c ("by mileage") in FIG. 5a is displayed as subject headings within cells 110a, 110b, and 110c, respectively, within the column of cells 105 as shown in FIG. 6. New information is now contained within the cells 130a ("147"), 130b ("156"), 130c ("Sportwagon"), 135a ("<$5,000"), 135b ("$5-10,000"), 135c ("$10-15,000"), 140a ("<50,000 ml"), 140b ("50-100,000 ml"), and 140c (">100,000 ml"). The history bar 150 continues to display the name of the hierarchical information as "Classifieds" and the position within the hierarchical information depicted by the graphical user interface 100 as "Cars—in my city, Alfa Romeo, by price".

In the example depicted, the user activates the focus cell 135b which contains "$5-10,000". An example of the resulting graphical user interface 100 may appear as shown in FIG. 7a.

FIG. 7a illustrates the graphical user interface 100 for accessing classified advertisements after the user activated the focus cell 135b in FIG. 6a, in accordance with one embodiment. Similar to the graphical user interface 100 depicted in FIG. 6a, the information formerly contained within the cells 135a ("<$5,000"), 135b ("$5-10,000"), and 135c ("$10-15,000") in FIG. 6a is displayed as subject headings within cells 110a, 110b, and 110c, respectively, within the column of cells 105 as shown in FIG. 7. New information is contained within the cells includes 130a ("'71 Spider $4950"), 130b ("'77 Spider $4950"), 135a ("'95 164 $9,650"), 135b ("'87 Spider $9,000"), 135c ("88 Spider $7,900"), 140a ("'91 Spider $11,995"). In this example, cells 130c, 140b, and 140c do not contain any information because the classified advertisements may have limited available data. The history bar 150 continues to display the name of the hierarchical information as "Classifieds" and the position within the hierarchical information depicted by the graphical user interface 100 now displays "Cars—in my city, Alfa Romeo, by price, $5-10,000".

Depending on the amount of information present within the hierarchical information, at the lowest level, the information displayed within the cells 130a, 130b, 130c, 135a, 135b, 135c, 140a, 140b, and 140c, may be highly related to each other thereby allowing the user to view a wide variety of related information within the adjacent cells 130a, 130b, 130c, 135a, 135b, 135c, 140a, 140b, and 140c.

As displayed in FIGS. 2-3 and 4a-7a, activating the focus cell 135b allows the user to access the lower level within the information hierarchy. As a lower level is accessed, the new subject headings within the cells 110a, 110b, and 110c are related to the former subject heading (the former contents of cell 110a). The relationship between the subject headings within the cells 110a, 110b, and 110c grows as the user accesses lower levels within the information hierarchy. Consequently, the content within the cells 130a, 130b, 130c, 135a, 135b, 135c, 140a, 140b, and 140c becomes increasingly related to the subject headings 110a, 110b, and 110c, as well as to each other. As a result, the graphical user interface 100 may display closely related information to the target of the search thereby allowing the user to access closely related information that may be of interest.

For example, in FIG. 3, the information contained within the cells 130a, 130b, 130c, 135a, 135b, 135c, 140a, 140b, and 140c as well as the subject headings contained within the cells 110a, 110b, and 110c are related to "Cars". In FIG. 4a, the information contained within the cells 130a, 130b, 130c, 135a, 135b, 135c, 140a, 140b, and 140c as well as the subject headings contained within the cells 110a, 110b, and 110c are related to "Cars" that are "in my city". In FIG. 7a, the information contained within the cells 130a, 130b, 130c, 135a, 135b, 135c, 140a, 140b, and 140c as well as the subject headings contained within the cells 110a, 110b, and 110c are related to "Cars", particularly "Alfa Romeo", which are "in my city", and between the prices of $5-10,000. Although the user may be interested in cars manufactured by Alfa Romeo in the user's city that are between the prices of $5-10,000, the graphical user interface also depicts cars manufactured by Alfa Romeo in the user's city that are both "<$5,000" and "$10-15000" which may be of interest to the user.

It will be appreciated by those skilled in the art that the graphical user interface 100 for accessing data may be used to navigate any hierarchical or structured data structure, including, but not limited to, databases and data trees. For example, the graphical user interface 100 may be operated as an interactive guide for television programming, internet web surfing, media content searching, image searching, audio searching, and data searching.

FIG. 4b illustrates an alternate depiction of the graphical user interface 100 for accessing classified advertisements after the user selected the adjacent cell 135c to the focus cell 135b in FIG. 3, in accordance with one embodiment. The focus cell 135b now contains "other location". The content within the other cells 130a, 130b, 130c, 135a, 135c, 140a, 140b, and 140 has shifted within the rows of cells 115, 120, and 125. As a result, new information is now displayed within the cells 130c ("2002"), 135c (" . . . "), and 140c ("BMW") while information formerly contained in the cells 130a, 135a, and 140a visible in FIG. 3 is no longer visible in FIG. 4b.

In the example depicted, the user activates the focus cell 135b which contains "other location". An example of the resulting graphical user interface 100 may appear as shown in FIG. 5b.

FIG. 5b illustrates an alternate depiction of the graphical user interface 100 for accessing classified advertisements after the user activated the focus cell 135b in FIG. 4b, in accordance with one embodiment. In this example, new information is displayed within all of the cells 110a, 110b, 110c, 130a, 130b, 130c, 135a, 135b, 135c, 140a, 140b, and 140c. New subject headings are displayed within 110a ("entire state"), 110b ("city"), and 110c ("[in Italy] provincial"). The new subject headings are related to the contents of the former activated focus cell 135b ("other location") in FIG. 4b.

The relationship between the contents of the cells 130a, 130b, 130c, 135a, 135b, 135c, 140a, 140b, and 140c within the rows of cells 115, 120, and 125, and the subject heading in the closest respective cell 110a, 110b, or 110c within the column of cells 105 is maintained. For example, cells 130a ("Colorado"), 130b ("Connecticut"), and 130c ("Delaware") are related to the subject heading "entire state" in the closest cell 110a within the column of cells 105. Similarly, cells 135a ("in Colorado"), 135b ("in Connecticut"), and 135c ("in Delaware") are related to the subject heading "city" in the closest cell 110b within the column of cells 105. Moreover, cell 140a ("Abruzzi"), 140b ("Valle d'Aosta"), and 140c ("Basilicata") are related to the subject heading "[in Italy] provincia" in the closest cell 110c within the column of cells 105.

The history bar 150 displays the name of the hierarchical information as "Classifieds" and the position within the hierarchical information depicted by the graphical user interface 100 as "Cars—other location".

In the example depicted, the user activates the focus cell 135b which contains "in Connecticut". An example of the resulting graphical user interface 100 may appear as shown in FIG. 6b.

FIG. 6b illustrates an alternate depiction of the graphical user interface 100 for accessing classified advertisements after the user activated the focus cell 135b in FIG. 5b, in accordance with one embodiment. In this example, new information is displayed within all of the cells 130a ("Boston"), 130b ("Roxbury"), 130c ("Salem"), 135a ("Bridgeport"), 135b ("New Haven"), 135c ("New London"), 140a ("Albany"), 140b ("New York"), and 140c ("Schenectady").

New subject headings which are displayed within 110a ("Massachusetts"), 110b ("Connecticut"), and 110c ("New York") are related to the former activated focus cell 135b ("in Connecticut") in FIG. 4b. As described herein, the relationship between the subject headings contained within cells 110a, 110b, and 110c and the formerly activated focus cell 135b may be controlled by the programming or the structure of the hierarchical information itself. As a result, the user may access any different position within the hierarchical information. For example, the user may activate the focus cell and new subject headings are displayed in the cells 110a, 110b, and 110c, within the column of cells 105, and new content is displayed within the cells 130a, 130b, 130c, 135a, 135b, 135c, 140a, 140b, and 140c. The user may immediately access any lower level, any upper level, or any different position within the same level of the hierarchical information.

FIG. 8 is a flowchart depicting a method for the graphical user interface, as may be used for accessing classified advertisements depicted in FIGS. 1-7, in accordance with one embodiment. FIG. 8 begins in step 800. In step 810, the grid of cells including the column of cells 105 and the adjacent rows of cells 115, 120, and 125 are displayed. Each cell 110a, 110b, and 110c within the column of cells 105 may contain a subject heading. Each cell 130a, 130b, 130c, 135a, 135b, 135c, 140a, 140b, and 140 within the rows of cells 115, 120, and 125 may contain information associated with the subject headings. In one embodiment, cell 135b is displayed as the focus cell 135b by the focus frame 145.

The column of cells 105 is orthogonal to the adjacent rows of cells 115, 120, and 125. The orientation of the digital device that displays the grid of cells does not alter the dimensional relationship between the column of cells 105 and the adjacent rows of cells 115, 120, and 125. For example, if the adjacent rows of cells 115, 120, and 125 are reoriented to appear as columns, the column of cells 105 will appear to be a row orthogonal to the reoriented adjacent rows of cells 115, 120, and 125 now displayed as columns.

The number of cells 110a, 110b, and 110c within the column of cells 105, the number of adjacent rows of cells 115, 120, and 125, and the number of cells 130a, 130b, 130c, 135a, 135b, 135c, 140a, 140b, and 140 may be chosen by the user, determined by the graphical user interface, determined by the hierarchical information, dependant upon the viewable dimensions of the digital device, or any one or more other factors.

In step 820, the graphical user interface 100 may receive a user input. If the user input is received, FIG. 8 continues to step 830. If the graphical user interface 100 does not receive the user input, then FIG. 8 ends in step 870.

In step 830, the graphical user interface 100 may receive the selection of one of the cells 130a, 130b, 130c, 135a, 135c, 140a, 140b, or 140 as the user input. If a selection of one of the cells 130a, 130b, 130c, 135a, 135c, 140a, 140b, or 140 is received, then FIG. 8 continues to step 840. Otherwise, FIG. 8 continues to step 850.

In step 840, the grid of cells with the content of the cells shifted within the adjacent rows of cells 115, 120, and 125 is displayed. In one embodiment, the focus cell 135b, the column of cells 105, and the rows of cells 115, 120, and 125 remain fixed. The content of the selected cell 130a, 130b, 130c, 135a, 135c, 140a, 140b, or 140c becomes the content of the focus cell 135b. In one embodiment, the user may select either the cells 135a or 135c, which are to the left and right of the focus cell 135*b*, or the cells 130*b* or 140*b* which are above and below the focus cell 135*b*.

If the user selects the cells 135*a* or 135*c*, the content of the cells 130*a*, 130*b*, 130*c*, 135*a*, 135*b*, 135*c*, 140*a*, 140*b*, and 140*c*, within the rows of cells 115, 120, or 125 appears to shift within the rows of cells 115, 120, and 125. New information may appear as the user scrolls the information through the visible cells. For example, if the user selects cell 135*a*, the contents of cell 135*a* shift to the focus cell 135*b*. Similarly, the former contents of cells 130*a* and 140*a* may shift to cells 130*b* and 140*b*, respectively. Further, the former contents of cells 130*b*, 135*b*, and 140*b* may shift to cells 130*c*, 135*c*, and 140*c*, respectively. The content that was in cells 130*c*, 135*c*, and 140*c*, appears to shift out of the graphical user interface 100. New information may appear within cells 130*a*, 135*a*, and 140*a*. In another example, the user selects cell 135*c*, and the contents within the cells 130*a*, 130*b*, 130*c*, 135*a*, 135*b*, 135*c*, 140*a*, 140*b*, and 140*c* within the rows of cells 115, 120, and 125 appear to shift in the opposite direction than the previous example.

If the user selects cells 130*b* or 140*b*, the content of the cells 130*a*, 130*b*, 130*c*, 135*a*, 135*b*, 135*c*, 140*a*, 140*b*, and 140*c*, within the rows of cells 115, 120, or 125 appears to shift within the rows of cells 115, 120, and 125. The subject headings within cells 110*a*, 110*b*, and 110*c* will also appear to shift within the column of cells 105. New information may appear as the user scrolls the information through the visible cells.

For example, if the user selects cell 130*b*, the contents of cell 130*b* shift to the focus cell 135*b*. Similarly, the former contents of cells 130*a* and 130*c* may shift to cells 135*a* and 135*c*, respectively. Further, the former contents of cells 135*a*, 135*b*, and 135*c* may shift to cells 140*a*, 140*b*, and 140*c*, respectively. The content that was in cells 140*a*, 140*b*, and 140*c*, appears to shift out of the graphical user interface 100. New information may appear within cells 130*a*, 130*b*, and 130*c*. Further, the subject heading within the cell 110*a* may shift to cell 110*b*. The subject heading within the cell 110*b* may shift to the cell 110*c*. The subject heading that was within the cell 110*c* may appear to shift out of the graphical user interface 100. A new subject heading may appear in the cell 110*a*.

In another example, the user selects cell 140*b*, and the contents within the cells 130*a*, 130*b*, 130*c*, 135*a*, 135*b*, 135*c*, 140*a*, 140*b*, and 140*c* within the rows of cells 115, 120, and 125 appear to shift in the opposite direction than the previous example. Similarly, the contents within the cells 110*a*, 110*b*, and 110*c* within the column of cells 105 also appear to shift in the opposite direction than the previous example.

Once step 840 is completed, the graphical user interface 100 returns to step 820 to receive the next user input.

In step 850, the graphical user interface 100 may receive the activation of the focus cell 135*b* as the user input. If the focus cell 135*b* is activated, then FIG. 8 continues to step 860. If the focus cell 135*b* is not activated, then FIG. 8 ends in FIG. 870.

In step 860, the focus cell 135*b* is activated. The content of the focus cell 135*b*, along with the content of the cells 135*a* and 135*c* within the adjacent row of cells 120 as the focus cell 135*b*, is displayed as subject headings within the cells 110*b*, 110*a*, and 110*c*, respectively, within the column of cells 105. New information is displayed within the cells 130*a*, 130*b*, 130*c*, 135*a*, 135*b*, 135*c*, 140*a*, 140*b*, and 140*c*.

In another embodiment, the user may have the option to select and activate the cell 130*a*, 130*b*, 130*c*, 135*a*, 135*c*, 140*a*, 140*b*, and 140*c* within a single action thereby allowing the contents of the selected cell 130*a*, 130*b*, 130*c*, 135*a*, 135*b*, 135*c*, 140*a*, 140*b*, or 140*c*, along with the contents of the cells within the same row of cells 115, 120, or 125 as the selected cell, to be displayed as subject headings within the contents of the column of cells 105.

After the new display is completed, the graphical user interface 100 waits to receive the next user input in step 820.

Although FIG. 8 depicts a number of functions, those skilled in the art will recognize that the graphical user interface 100 may perform many functions. For instance, a "more information" function may be added to display additional information about the contents of the cell 110*a*, 110*b*, 110*c*, 130*a*, 130*b*, 130*c*, 135*a*, 135*b*, 135*c*, 140*a*, 140*b*, or 140*c*, as well as a "back" function to undo the last selection or activation.

Figure 9A:
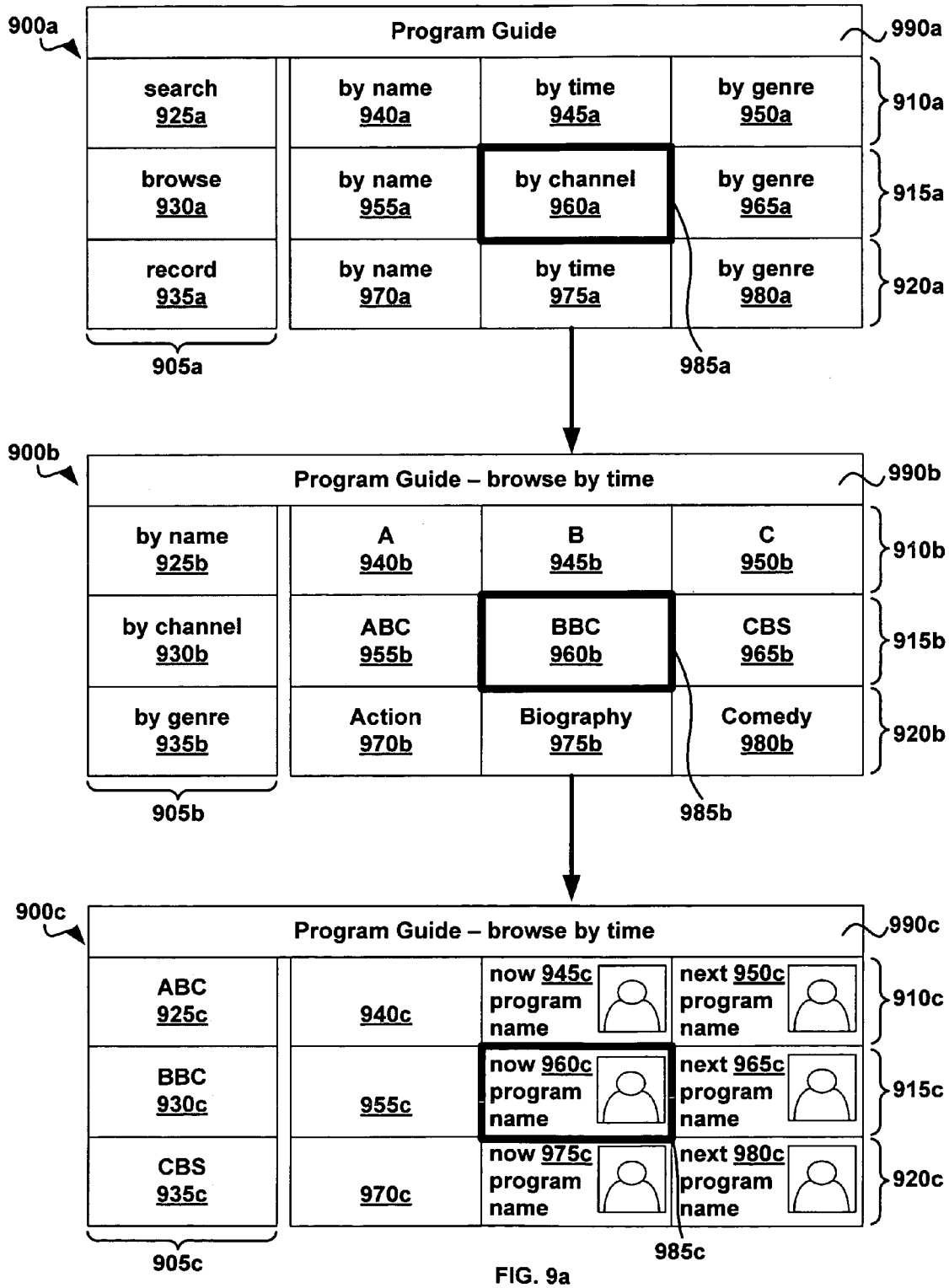
FIG. 9a illustrates three consecutive stages of a graphical user interface for accessing a programming guide in accordance with one embodiment.

FIG. 9*a* illustrates three consecutive stages 900*a*, 900*b*, and 900*c* of a graphical user interface for accessing a programming guide in accordance with one embodiment.

In the first stage 900*a* of the graphical user interface, the history bar 990*a* displays the name of the hierarchical information as "Program Guide." The cells 925*a* ("search"), 930*a* ("browse"), and 935*a* ("record") are within the column of cells 905*a*. Cells 940*a* ("by name"), 945*a* ("by time"), 950*a* ("by genre"), are within the row of cells 910*a*. Cells 955*a* ("by name"), 960*a* ("by time"), 965*a* ("by genre"), are within the row of cells 915*a*. Cells 970*a* ("by name"), 975*a* ("by time"), 980*a* ("by genre"), are within the row of cells 920*a*. The focus cell 960*a* ("by time") is surrounded by the focus frame 985*a*.

In the example depicted, the user activates the focus cell 960*a* which contains "by time". As a result, the next stage 900*b* of the graphical user interface may appear.

In the next stage 900*b*, the former contents of the row of cells 915*a* are displayed as individual subject headings within the cells 925*b*, 930*b*, and 935*b*. New information is displayed within the cells 940*b* ("A"), 945*b* ("B"), 950*b* ("C"), 955*b* ("ABC"), 960*b* ("BBC"), 965*b* ("CBS"), 970*b* ("Action"), 975*b* ("Biography"), and 980*b* ("Comedy"). The history bar 990*b* continues to display the title, "Program Guide", as well as the current position within the hierarchical information, "browse by time".

In the example depicted in stage 900*b*, the user activates the focus cell 960*b* which contains "BBC" to "browse" (depicted in the history bar 990*b*) the programs available on the "BBC" channel "by time" (depicted as the subject heading contained within cell 930*b*.) As a result, the next stage 900*c* of the graphical user interface may appear.

In the next stage 900*c*, the former contents of the row of cells 915*b* are displayed as individual subject headings within the cells 925*c*, 930*c*, and 935*c*. New information in the form of television programming is displayed within the cells contained in the row of cells 910*c*, 915*c*, and 920*c*. The history bar 990*c* continues to display the title, "Program Guide", as well as the current position within the hierarchical information, "browse by time". In this example, the television programming information displayed within the cells 945*c*, 950*c*, 960*c*, 965*c*, 975*c*, and 980*c* is related to the closest subject heading within the cells 925*c* ("ABC"), 930*c* ("BBC"), and 935*c* ("CBS") as well as "by time".

In this example, the contents of the focus cell 960*c* is displayed as a television program that is currently being broadcast. The contents of the cells 940*c*, 955*c*, and 970*c* to the left of the focus cell 960*c* may represent television programs in the past and are left blank in this example. The user may browse a future program broadcasted by the "BBC" by selecting the cell 950*c*, 970*c*, or 980*c* to the right of the focus cell 960*c*.

In the example depicted in stage 900c, the user selects the cell 970c to the right of the focus cell 960c. As a result, the next stage 900d in FIG. 9b of the graphical user interface may appear.

Figure 9B:
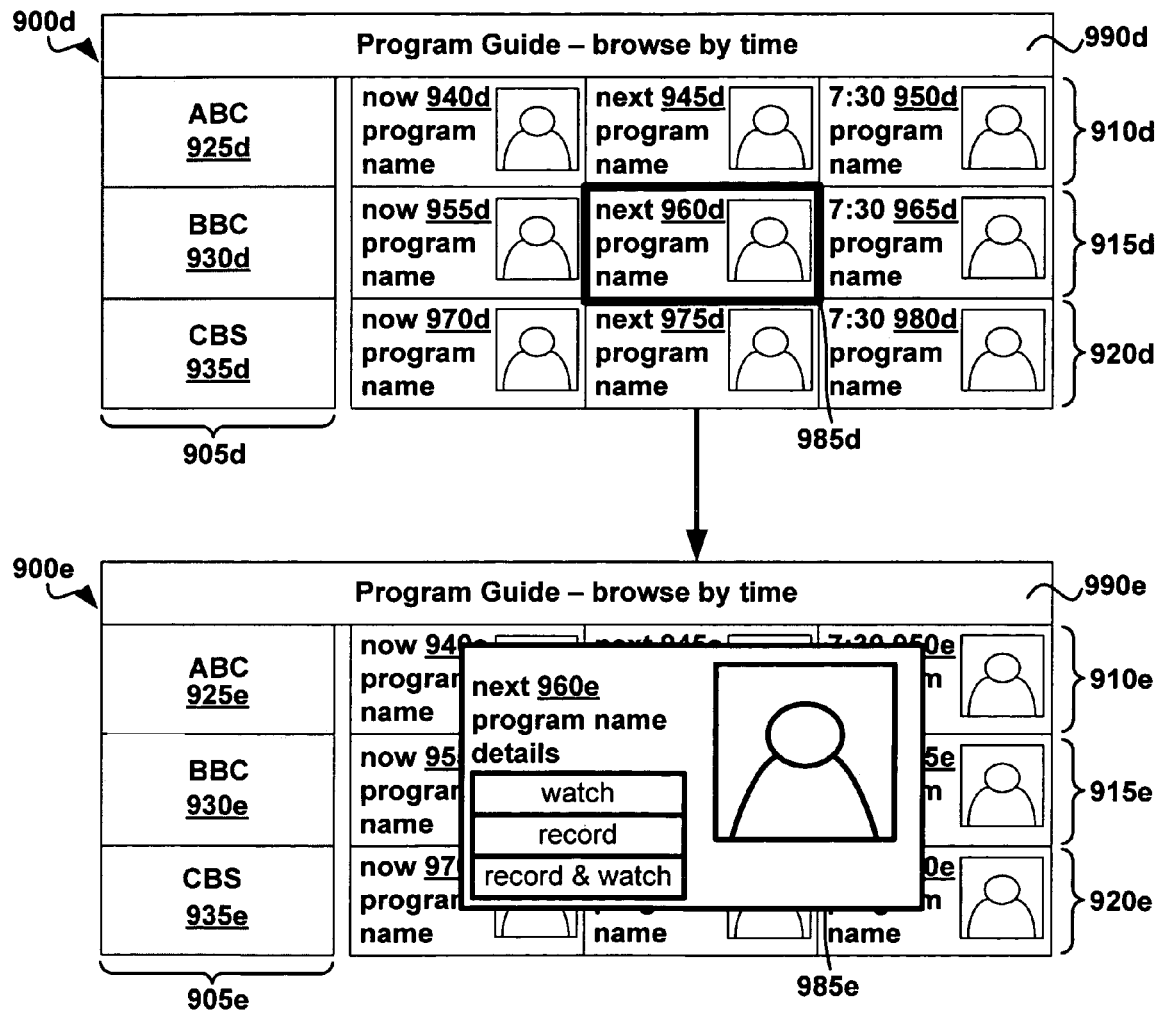
FIG. 9b illustrates two further consecutive stages of a graphical user interface 900d and 900e for accessing a programming guide in accordance with one embodiment.

FIG. 9b illustrates two further consecutive stages of a graphical user interface 900d and 900e for accessing a programming guide in accordance with one embodiment.

In the stage 900d, the content within each cell 945c, 950c, 960c, 965c, 975c, and 980c have shifted, respectively, to cells 940d, 945d, 955d, 960d, 970d, 975d. The contents of the formerly blank cells 940c, 955c, and 970c have appeared to shift out of the graphical user interface. Similarly, new information is displayed within the cells 950d, 965d, and 980d.

In the example depicted in stage 900d, the user activates the focus cell 960d. As a result, the next stage 900e of the graphical user interface may appear.

In the stage 900e, the lowest level of the hierarchical information has been achieved. By activating the focus cell 960d, details of the selected program are displayed along with television options to "watch" 987d, "record" 989d, or "record & watch" 991d. By choosing the television options, the graphical user interface may provide the user with the ability to control a television, media device, audio device, or recording device. Those skilled in the art will recognize that many digital devices may be controlled by the user using the graphical user interface.

Figure 10:
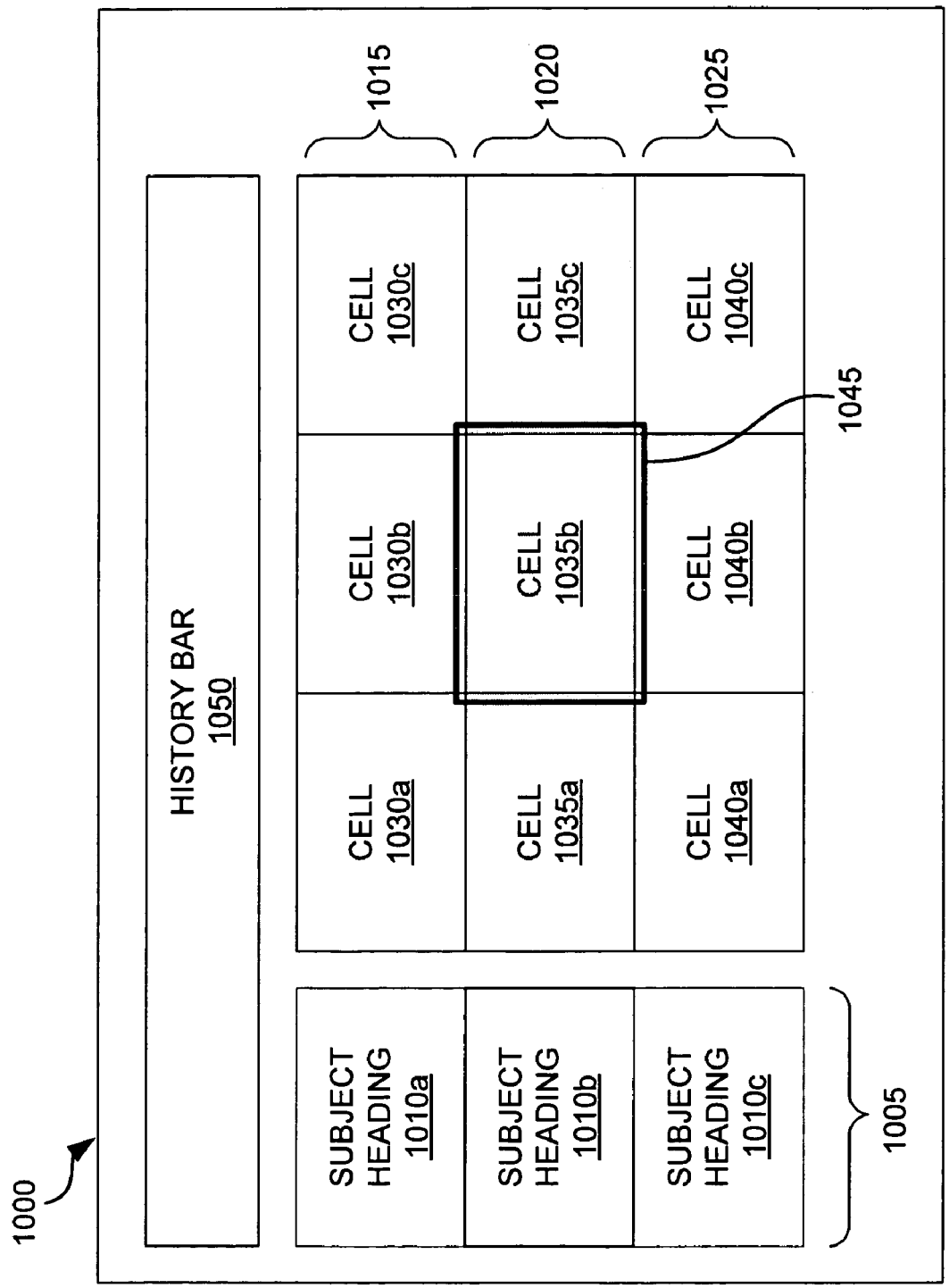
FIG. 10 illustrates a block diagram of the graphical user interface for accessing data, in accordance with one embodiment.

FIG. 10 illustrates a block diagram of an interactive portion 1000 of the graphical user interface for accessing data, in accordance with one embodiment. The interactive portion 1000 of the graphical user interface comprises a history bar 1050, a column of cells 1005 including cells 1010a, 1010b, and 1010c, a first row of cells 1015 including cells 1030a, 1030b, and 1030c, a second row of cells 1020 including cell 1035a, focus cell 1035b, and cell 1035c, a third row of cells 1025 including cells 1040a, 1040b, 1040c, and a focus frame 1045 surrounding the focus cell 1035b.

The history bar 1050 is displayed above the interactive portion of the graphical user interface. The history bar 150 may be placed in any position within the display of the digital device. The history bar 150 may also include a feature whereby when the history bar 150 is selected, the user may return to the initial view of the interactive portion of the graphical user interface 1000 or return to any previous action within the interactive portion of the graphical user interface 1000.

Figure 11:
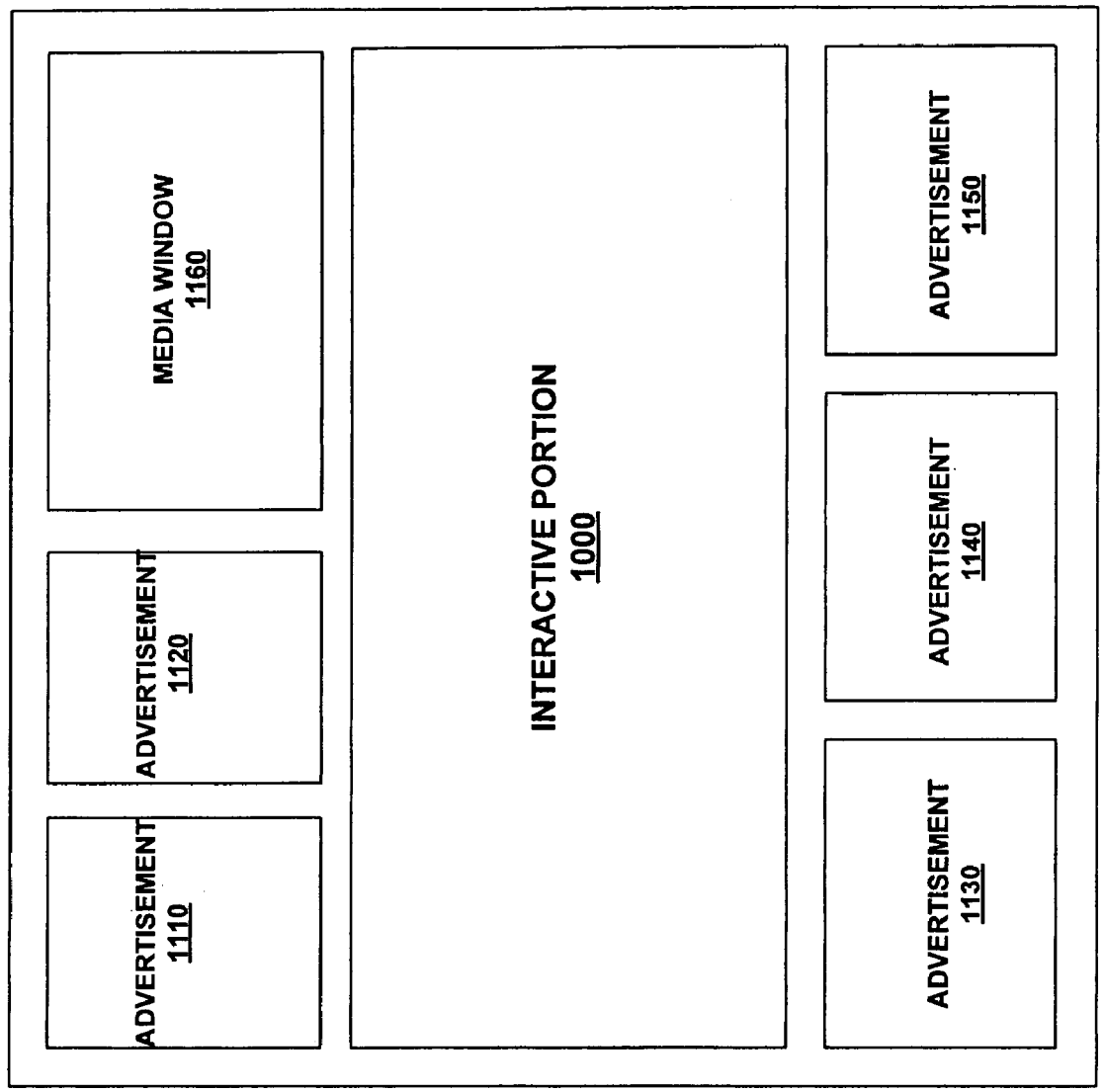
FIG. 11 illustrates a block diagram of the graphical user interface for accessing data including advertisements and the media window, in accordance with one embodiment.

FIG. 11 illustrates a block diagram of the graphical user interface for accessing data including advertisements and a media window, in accordance with one embodiment. The graphical user interface 1100 depicts an interactive portion 1000 as in FIG. 10 surrounded by advertisements 1110, 1120, 1130, 1140, 1150, and a media window 1160.

FIG. 11 depicts a number, position, and dimensions of the advertisements 1110, 1120, 1130, 1140, and 1150, in a single embodiment. There may be any number of advertisements 1110, 1120, 1130, 1140, or 1150, either immediately surrounding the active portion 1100 or somewhere displayed upon the device display. The position and dimensions of the individual advertisements 1110, 1120, 1130, 1140, or 1150 may be determined by the advertiser, the user, the available viewable dimensions of the display device, the graphical user interface, or a combination of these. The advertisements may be directly related to the data being accessed.

The advertisements 1110, 1120, 1130, 1140, or 1150, content, number of advertisements 1110, 1120, 1130, 1140, or 1150, and dimensions of advertisements 1110, 1120, 1130, 1140, or 1150, may change as the user interacts with the graphical user interface. The advertisements 1110, 1120, 1130, 1140, or 1150 may also be related to user preferences or searching habits of the user.

The media window 1160 may play media content, video, audio, or images that may be related to the data being accessed. The content within the media window 1160 may change as the user interacts with the graphical user interface. As an example, if the graphical user interface is being utilized as an interactive television guide, the window media may play clips with current news, music videos, or sports highlights. In another example, if the user is browsing current or future television shows as depicted in 920, 930, and 940 in FIG. 9, then the media window 1160 may play the current program or trailers for future programs.

Figure 12:
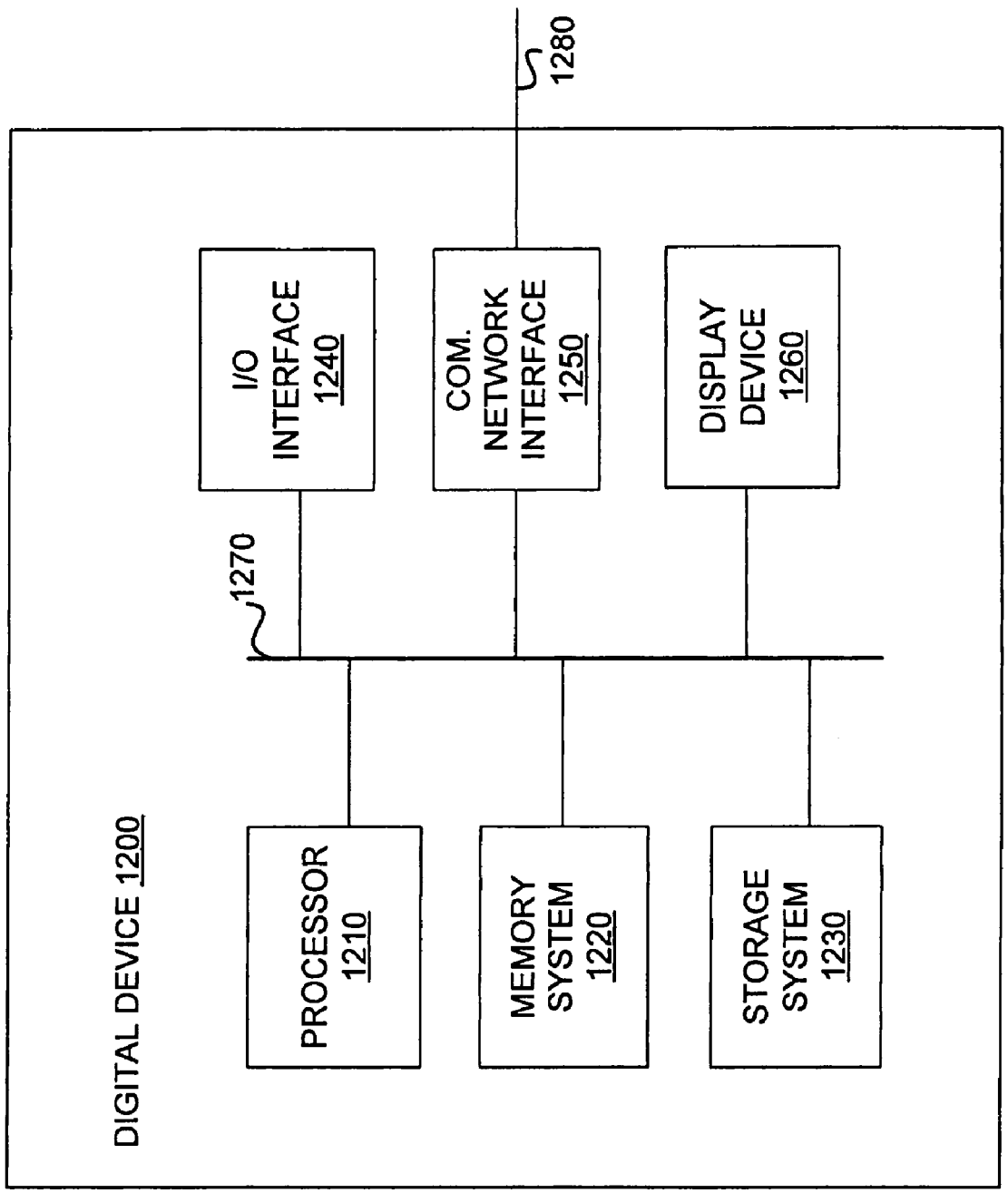
FIG. 12 illustrates a block diagram of a digital device that may implement the graphical user interface, in accordance with one embodiment.

FIG. 12 illustrates a block diagram of a digital device that may be used to implement the graphical user interface, in accordance with one embodiment. The digital device 1200 is any device, with or connected to a display, that may be implemented in either hardware, software, or both. Examples of digital devices 1200 include, but are not limited to, televisions, computers, personal digital assistants, cell phones, laptops, servers, terminals, electronic watches, programmed or dedicated logic circuits, personal media devices, and personal video players.

The digital device 1200 includes a system bus 1270 coupled to a processor 1210, memory system 1220, storage system 1230, input/output (I/O) interface 1240, communications (com.) network interface 1250, and an optional display device 1260. The communications network interface 1250 can be further coupled to an external communications link 1280.

The processor 1210 is configured to execute software or instructions. The memory system 1220 is any memory device configured to hold data, either permanently or temporarily, to make the data available to any components connected to the system bus 1270. The I/O interface 1240 is any interface or device configured to provide input or output to the user of the digital device 1200. For example, the I/O interface 1270 may include a video interface, a remote control, a keypad, joystick, touch-screen, or buttons.

The storage system 1230 is any storage device or group of storage devices configured to store data permanently or temporarily. Note that the storage system 1230 is optional and its functionality may be handled by the memory system 1220. The optional communications network interface 1250 is any communication interface configured to transfer data between any components connected to the system bus 1270 and any communications network over the optional external communications link 1280.

The display device 1260 is any device configured to visually interact with the user of the digital device 1200. For example, the display device 1260 may be a television screen, a monitor, a touch-screen, a tablet display, a display for a cell phone, a display for a personal digital assistant, or a terminal display.

The embodiments discussed herein are illustrative of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A method comprising:

displaying a graphical user interface comprising a column of cells comprising a first cell containing a first subject heading and a second cell containing a second subject heading, a first row of cells adjacent to the first cell, the first row of cells comprising a third cell containing a first content related to the first subject heading and a fourth cell containing a second content related to the first subject heading, and a second row of cells adjacent to the second cell and the first row of cells, the second row of cells comprising a fifth cell containing a third content related to the second subject heading, and a focus cell containing a fourth content related to the second subject heading;

receiving a first focus cell activation from a user; and redisplaying the graphical user interface comprising the column of cells comprising the first cell containing a third subject heading comprising the third content and the second cell containing a fourth subject heading comprising the fourth content, the first row of cells comprising the third cell containing a fifth content related to the third subject heading and the fourth cell containing a sixth content related to the third subject heading, and the second row of cells comprising the fifth cell containing a seventh content related to the fourth subject heading, and the focus cell containing an eighth content related to the fourth subject heading.

2. The method of claim 1, further comprising:

receiving a cell selection from the user; and redisplaying the third cell containing the sixth content related to the third subject heading, the fourth cell containing a ninth content related to the third subject heading, the fifth cell containing the eight content related to the fourth subject heading, and the focus cell containing a tenth content related to the fourth subject heading.

3. The method of claim 1, further comprising:

receiving a cell selection from the user; and redisplaying the third cell containing a ninth content related to the third subject heading, the fourth cell containing the fifth content related to the third subject heading, the fifth cell containing a tenth content related to the fourth subject heading, and the focus cell containing the seventh content related to the fourth subject heading.

4. The method of claim 1, further comprising:

receiving a cell selection from the user; and redisplaying the first cell containing the fourth subject heading, the second cell containing a fifth subject heading, the third cell containing the seventh content related to the fourth subject heading, the fourth cell containing the eighth content related to the fourth subject heading, the fifth cell containing a ninth content related to the fifth subject heading, and the focus cell containing a tenth content related to the fifth subject heading.

5. The method of claim 1, further comprising:

receiving a cell selection from the user; and redisplaying the first cell containing a fifth subject heading, the second cell containing the third subject heading, the third cell containing a ninth content related to the fifth subject heading, the fourth cell containing a tenth content related to the fifth subject heading, the fifth cell containing the fifth content related to the third subject heading, and the focus cell containing the sixth content related to the third subject heading.

6. The method of claim 1, further comprising:

receiving a second focus cell activation from the user; and redisplaying the first cell containing a fifth subject heading, the second cell containing a sixth subject heading, the third cell containing a ninth content related to the fifth subject heading, the fourth cell containing a tenth content related to the fifth subject heading, the fifth cell containing an eleventh content related to the sixth subject heading, and the focus cell containing a twelfth content related to the sixth subject heading.

7. The method of claim 1, wherein displaying the graphical user interface further comprises displaying a focus frame surrounding the focus cell.

8. The method of claim 1, further comprising displaying a history bar that indicates a position within a data structure.

9. The method of claim 1, further comprising displaying one or more advertisements.

10. The method of claim 1, further comprising displaying a media window.

11. A system comprising:

a graphical user interface comprising a column of cells comprising a first cell containing a first subject heading and a second cell containing a second subject heading, a first row of cells adjacent to the first cell, the first row of cells comprising a third cell containing a first content related to the first subject heading and a fourth cell containing a second content related to the first subject heading, and a second row of cells adjacent to the second cell and the first row of cells, the second row of cells comprising a fifth cell containing a third content related to the second subject heading, and a focus cell containing a fourth content related to the second subject heading;

a means to receive a first focus cell activation from a user; and a means to redisplay the graphical user interface comprising the first cell containing a third subject heading comprising the third content and the second cell containing a fourth subject heading comprising the fourth content, the first row of cells comprising the third cell containing a fifth content related to the third subject heading and the fourth cell containing a sixth content related to the third subject heading, and the second row of cells comprising the fifth cell containing a seventh content related to the fourth subject heading, and the focus cell containing an eighth content related to the fourth subject heading.

12. The system of claim 11, further comprising:

a means to receive a cell selection from the user; and a means to redisplay the third cell containing the sixth content related to the third subject heading, the fourth cell containing a ninth content related to the third subject heading, the fifth cell containing the eight content related to the fourth subject heading, and the focus cell containing a tenth content related to the fourth subject heading.

13. The system of claim 11, further comprising:

a means to receive a cell selection from the user; and a means to redisplay the third cell containing a ninth content related to the third subject heading, the fourth cell containing the fifth content related to the third subject heading, the fifth cell containing a tenth content related to the fourth subject heading, and the focus cell containing the seventh content related to the fourth subject heading.

14. The system of claim 11, further comprising:

a means to receive a cell selection from the user; and a means to redisplay the first cell containing the fourth subject heading, the second cell containing a fifth subject heading, the third cell containing the seventh content related to the fourth subject heading, the fourth cell containing the eighth content related to the fourth subject heading, the fifth cell containing a ninth content related to the fifth subject heading, and the focus cell containing a tenth content related to the fifth subject heading.

15. The system of claim 11, further comprising:

a means to receive a cell selection from the user; and a means to redisplay the first cell containing a fifth subject heading, the second cell containing the third subject heading, the third cell containing a ninth content related to the fifth subject heading, the fourth cell containing a tenth content related to the fifth subject heading, the fifth cell containing the fifth content related to the third subject heading, and the focus cell containing the sixth content related to the third subject heading.

16. The system of claim 11, further comprising:

a means to receive a second focus cell activation from the user; and a means to redisplay the first cell containing a fifth subject heading, the second cell containing a sixth subject heading, the third cell containing a ninth content related to the fifth subject heading, the fourth cell containing a tenth content related to the fifth subject heading, the fifth cell containing an eleventh content related to the sixth subject heading, and the focus cell containing a twelfth content related to the sixth subject heading.

17. The system of claim 11, wherein the graphical user interface further comprises a focus frame surrounding the focus cell.

18. The system of claim 11, further comprising a means to display a history bar that indicates a position within a data structure.

19. The system of claim 11, further comprising a means to display one or more advertisements.

20. The system of claim 11, further comprising a means to display a media window.

21. An interactive guide system comprising:

a display device configured to initially display a graphical user interface comprising a column of cells comprising a first cell containing a first subject heading and a second cell containing a second subject heading, a first row of cells adjacent to the first cell, the first row of cells comprising a third cell containing a first content related to the first subject heading and a fourth cell containing a second content related to the first subject heading, and a second row of cells adjacent to the second cell and the first row of cells, the second row of cells comprising a fifth cell containing a third content related to the second subject heading, and a focus cell containing a fourth content related to the second subject heading;

an input/output interface configured to receive a first focus cell activation from a user; and a processor configured to command the display device to redisplay the graphical user interface comprising the first cell containing a third subject heading comprising the third content and the second cell containing a fourth subject heading comprising the fourth content, the first row of cells comprising the third cell containing a fifth content related to the third subject heading and the fourth cell containing a sixth content related to the third subject heading, and the second row of cells comprising the fifth cell containing a seventh content related to the fourth subject heading, and the focus cell containing an eighth content related to the fourth subject heading.

22. The interactive guide system of claim 21, wherein the input/output device is further configured to receive a cell selection from the user and the processor is further configured to command the display device to redisplay the third cell containing the sixth content related to the third subject heading, the fourth cell containing a ninth content related to the third subject heading, the fifth cell containing the eight content related to the fourth subject heading, and the focus cell containing a tenth content related to the fourth subject heading.

23. The interactive guide system of claim 21, wherein the input/output device is further configured to receive a cell selection from the user and the processor is further configured to command the display device to redisplay the third cell containing a ninth content related to the third subject heading, the fourth cell containing the fifth content related to the third subject heading, the fifth cell containing a tenth content related to the fourth subject heading, and the focus cell containing the seventh content related to the fourth subject heading.

24. The interactive guide system of claim 21, wherein the input/output device is further configured to receive a cell selection from the user and the processor is further configured to command the display device to redisplay the first cell containing the fourth subject heading, the second cell containing a fifth subject heading, the third cell containing the seventh content related to the fourth subject heading, the fourth cell containing the eighth content related to the fourth subject heading, the fifth cell containing a ninth content related to the fifth subject heading, and the focus cell containing a tenth content related to the fifth subject heading.

25. The interactive guide system of claim 21, wherein the input/output device is further configured to receive a cell selection from the user and the processor is further configured to command the display device to redisplay the first cell containing a fifth subject heading, the second cell containing the third subject heading, the third cell containing a ninth content related to the fifth subject heading, the fourth cell containing a tenth content related to the fifth subject heading, the fifth cell containing the fifth content related to the third subject heading, and the focus cell containing the sixth content related to the third subject heading.

26. The interactive guide system of claim 21, wherein the input/output device is further configured to receive a second focus cell activation from the user and the processor is further configured to command the display device to redisplay the first cell containing a fifth subject heading, the second cell containing a sixth subject heading, the third cell containing a ninth content related to the fifth subject heading, the fourth cell containing a tenth content related to the fifth subject heading, the fifth cell containing an eleventh content related to the sixth subject heading, and the focus cell containing a twelfth content related to the sixth subject heading.

27. The interactive guide system of claim 21, wherein the display device is further configured to display a focus frame surrounding the focus cell.

28. The interactive guide system of claim 21, wherein the display device is further configured to display a history bar that indicates a position within a data structure.

29. The interactive guide system of claim 21, wherein the display device is further configured to display advertising information.

30. The interactive guide of claim 21, wherein the display device is further configured to display a media window.

31. The interactive guide system of claim 21, further comprising a storage system configured to store a database of advertising information.

* * * * *